(12) United States Patent
Heidebrink

(10) Patent No.: US 7,291,933 B1
(45) Date of Patent: Nov. 6, 2007

(54) DOUBLE ALTERNATOR AND ELECTRICAL SYSTEM FOR A VEHICLE

(76) Inventor: Ron Heidebrink, 2805 Sandy Branch Rd., Longs, SC (US) 29868

( * ) Notice: Subject to any disclaimer, the term of this patent is extended or adjusted under 35 U.S.C. 154(b) by 0 days.

(21) Appl. No.: 11/734,003

(22) Filed: Apr. 11, 2007

(51) Int. Cl.
*H02K 3/00* (2006.01)
*H02J 7/16* (2006.01)

(52) U.S. Cl. .................. 290/4 R; 322/22; 180/65.4; 310/198

(58) Field of Classification Search ................ 290/4 R, 290/4 A, 4 B, 4 C, 6; 74/6; 310/198; 180/65.4
See application file for complete search history.

(56) References Cited

U.S. PATENT DOCUMENTS

| 653,088 | A | | 7/1900 | Leblanc |
| 2,085,275 | A | | 6/1937 | Schmidt |
| 4,336,485 | A | * | 6/1982 | Stroud ........................ 320/126 |
| 4,347,473 | A | * | 8/1982 | Stroud ........................ 320/126 |
| 4,476,395 | A | | 10/1984 | Cronin |
| 4,539,515 | A | * | 9/1985 | Morishita et al. ........... 320/123 |
| 4,757,249 | A | | 7/1988 | Farber et al. |
| 4,829,228 | A | * | 5/1989 | Buetemeister ................ 322/27 |
| 4,992,672 | A | * | 2/1991 | Norton ...................... 307/10.1 |
| 5,254,936 | A | * | 10/1993 | Leaf et al. ..................... 322/90 |
| 5,424,599 | A | * | 6/1995 | Stroud ........................ 310/198 |
| 5,600,232 | A | * | 2/1997 | Eavenson et al. ............. 322/12 |
| 5,739,676 | A | * | 4/1998 | Judge et al. ................... 322/22 |
| 6,044,923 | A | * | 4/2000 | Reagan et al. ............. 180/65.4 |
| 2005/0104460 | A1 | * | 5/2005 | Kusase et al. ................ 310/63 |
| 2007/0007847 | A1 | * | 1/2007 | Maekawa et al. ........... 310/263 |

* cited by examiner

*Primary Examiner*—Nicholas Ponomarenko
(74) *Attorney, Agent, or Firm*—Adams Evans P.A.

(57) ABSTRACT

A double alternator for a vehicle and a vehicle electrical system employing the double alternator.

19 Claims, 7 Drawing Sheets

DOUBLE ALTERNATOR AND ELECTRICAL SYSTEM FOR A VEHICLE

TECHNICAL FIELD AND BACKGROUND

The present invention relates to the field of electrical current supply systems and more particularly, a double alternator and associated electrical system for reliably supplying current to a motor vehicle.

Motor vehicles have in the past been provided with auxiliary alternators for providing back up power to a vehicle battery. In many cases, these auxiliary systems have also included an auxiliary battery. Providing a separate alternator and battery, however, adds a significant amount of weight to the vehicle, especially if the vehicle is an aircraft, and increases the cost of the vehicle, owing to the unnecessary duplication of alternator parts and mounting hardware. Many prior art systems also suffer the disadvantage that the current produced by one alternator cannot be cross fed to power a single battery.

Accordingly, there remains a need for a double alternator electrical system that is lightweight, reliable, inexpensive to manufacture, simple and cost effective. Also, there is a need for a double alternator that is capable of being mounted on a motor using existing hardware in the same location as a conventional alternator. The double alternator should be versatile inasmuch as it is capable of use in single and dual battery vehicle electrical systems and in systems that provides cross feed capability between dual electrical power circuits. In the dual battery system, the double alternator system should be capable of replacing existing production of motor-charging engines. For example, the double alternator system should be capable of replacing a 90 amp alternator and 500 amp single battery system to provide two 250 amp batteries and, in effect, two 45 amp alternators using the same space required by the existing system, and capable of control via voltage regulators, whether internal, external, or one of each. Finally, the double alternator should improve safety and delay maintenance of the vehicle charging electrical system.

SUMMARY OF THE DISCLOSURE

Therefore it is an object of the invention to provide a lightweight double alternator for a vehicle.

It is another object of the invention to provide a reliable double alternator electrical system for a vehicle.

It is another object of the invention to provide a double alternator system that is simple, inexpensive to manufacture, and thus cost effective It is another object of the invention to provide a double alternator system that is versatile inasmuch as it is capable of use in single and dual battery vehicle electrical systems.

It is another object of the invention to provide and in systems that provides cross feed capability between dual electrical power circuits.

These and other objects of the present invention are achieved in the preferred embodiments disclosed below by providing an electrical system for a vehicle having a motor. The system includes a housing including an adapter housing disposed between opposing front and rear housing sections and a drive assembly. The drive assembly includes a shaft journalled in the front and rear housing sections and a pulley fixed radially about the shaft for being driven by the vehicle motor. A pair of stators, each including an output winding, provide a multi-phase AC voltage by virtue of a pair of rotors each fixed radially about the shaft for rotation therewith producing a magnetic field to induce the multi-phase AC voltage across the output windings of the stators. Two sets of slip rings, each encircle the shaft and are electrically connected to one of the windings of one of the pair of rotors and insulated from the other slip rings and the shaft, and a pair of multi-phase full wave rectifiers, each electrically connected to one of the stators, receive the three-phase AC voltage produced across the winding of one of the stators and convert the AC voltage to DC voltage. Each of two sets of brushes are electrically connected to one of the slip rings to receive field current from a voltage regulator, and a pair of voltage regulators for control DC voltage output.

According to another preferred embodiment of the invention the electrical system includes a storage battery comprising a main system terminal and a ground terminal connected to a system ground, the main terminal connected to both the of the rectifiers for receiving the DC voltage and providing electrical power to the vehicle.

According to another preferred embodiment of the invention, the voltage regulators are connected to the field windings and sense an amount of current in the system to control an amount provided to the field windings.

According to another preferred embodiment of the invention, the system includes a pair of single pole switches, each one of the pair for selectively connecting the main terminal to one of the field windings.

According to another preferred embodiment of the invention, the system includes a pair of indicator lamps, each one of the pair connected between one of the pair of single pole switches and one of the field windings to indicate whether the field winding is receiving current from the main terminal.

According to another preferred embodiment of the invention, the electrical system includes a housing including an adapter housing disposed between opposing front and rear housing sections and a drive assembly that includes a shaft journalled in the front and rear housing sections and a pulley fixed radially about the shaft for being driven by the vehicle motor. A pair of rotors each include a field winding and are each fixed radially about the shaft for rotation therewith for providing current to produce a magnetic field to induce three-phase AC voltage, and a stator corresponding to each rotor each includes an output winding fixed around one of the rotors for producing the three-phase AC voltage. A set of brushes corresponds to each rotor and a pair three-phase full wave rectifiers are each electrically connected to one of the output windings for receiving the three-phase AC voltage produced across the windings of one of the stators and converting the AC voltage to DC voltage. A pair of voltage regulators each control DC voltage output from one of the rectifiers, and a first storage battery is connected to a system ground and a first electrical power subsystem to receive DC voltage from one of the pair of three-phase full wave rectifiers. A second storage battery connected to a system ground and a second electrical power subsystem to receive DC voltage from the other of the pair of three-phase full wave rectifiers and a cross feed switch selectively cross feeds DC voltage between the first and second subsystems.

According to another preferred embodiment of the invention, the electrical system includes a front bus bar connected to the first power subsystem.

According to another preferred embodiment of the invention, the electrical system includes a computer, ignition, and radio connected to the front bus bar.

According to another preferred embodiment of the invention, the electrical system includes a rear bus bar connected to the second power subsystem.

According to another preferred embodiment of the invention, the electrical system includes interior lights, headlights, seats and an air conditioner connected to the rear bus bar.

According to another preferred embodiment of the invention, the electrical system includes a cross feed contactor between the electrical power subsystems.

According to another preferred embodiment of the invention, the electrical system includes a double pole starter switch.

According to another preferred embodiment of the invention, the system includes a manual double pole master switch.

According to another preferred embodiment of the invention, both batteries are energized to start the vehicle motor.

According to another preferred embodiment of the invention, the system includes a starter for starting the vehicle motor.

According to another preferred embodiment of the invention, the system includes a housing enclosing a pair of rotor windings fixed to a shaft to rotate to produce magnetic fields inducing a.c. voltage across a stator windings corresponding to each rotor. A rectifier is electrically connected to a one of the pair of stators to convert a.c. voltage from the first of the pair to d.c. voltage for charging a storage battery, a rectifier electrically connected to the other of the pair of stators to convert a.c. voltage from the other stator winding to d.c. voltage for charging the storage battery. A controller is connected to both of the rotor windings for controlling an amount of voltage supplied to the rotor windings and hence the voltage supplied by the stators to charge the storage battery, and an electrical circuit supplies power to the vehicle connected to the battery.

According to another preferred embodiment of the invention, the voltage regulators employ shunts for measuring output voltage and or amperage from the rectifiers.

According to another preferred embodiment of the invention, the controller equalizes the field current provided to the rotor windings.

According to another preferred embodiment of the invention, the system includes independent annunciator lamps for indicating alternator operating statuses.

BRIEF DESCRIPTION OF THE DRAWINGS

The invention may be best understood by reference to the following description in conjunction with the accompanying drawing figures in which.

DESCRIPTION OF PREFERRED
EMBODIMENTS

Figure 1:
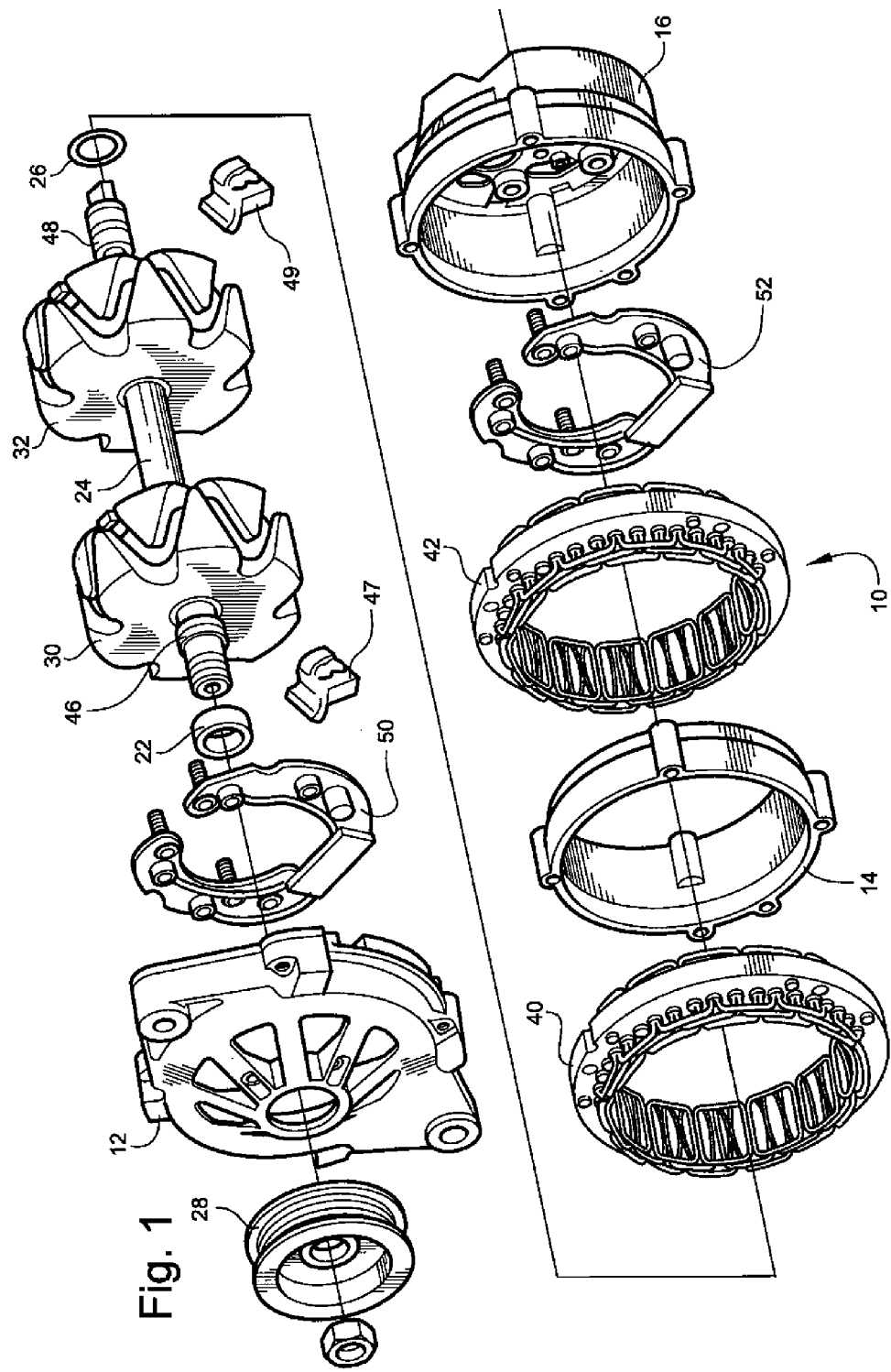
FIG. 1 is a double alternator according to an embodiment of the invention.

FIG. 1 is an embodiment of a double alternator 10 for a vehicle having a motor. A housing having an adapter housing 14 is disposed between front 12 and rear 16 housing sections and a drive assembly including a rotatable shaft 24 is journalled in bearings 22 and 26 fitted in the housing. A pulley 28 is fixed radially to the shaft 24 for receiving a belt driven by the vehicle motor (not shown). The double alternator 10 also includes a pair of rotors 30 and 32 each including field windings fixed radially to the shaft 24 for rotation within one of a pair of stators 40 and 42 having windings across which voltage is induced by rotor windings. Two sets of slip rings 46 and 48 encircle the shaft 24 with one of each of the set electrically connected to one of the rotor windings and insulated from the other slip rings and the shaft 24. Each one of a pair of three-phase full wave rectifiers 50 and 52 is connected to one of the stators 40 or 42 and pair of voltage regulators control DC voltage output. One half of the double alternator 10 comprises the rotor 30, stator 40, slip rings 46, brushes 47 and rectifier 50, while the other half comprises the rotor 32, stator 42, slip rings 48, brushes 49 and rectifier 52.

In operation, from an ignition key or switch, voltage is sent to an overvoltage relay, if one is used, to a regulator. The regulator adds positive voltage to a field wire, positive voltage to the brush 49 and the positive slip ring 48 to rotor 32 winding. Voltage flows back out of rotor 32 to a negative slip ring to a negative brush to ground. This circuit field/rotor is turned on and off by the regulator. The regulator is monitoring the output volts. The rotor 32 spinning and with voltage creates a magnetic field. The stator windings 42 are energized by the magnetic fields of the rotor. The stator (normal three phase) produces voltage pulses out to rectifier (diodes). Output of rectifier goes to battery positive lead. Negative diodes are also necessary for d.c. current, in the invention. This is done by the halves separately and at the same time.

Figure 2:
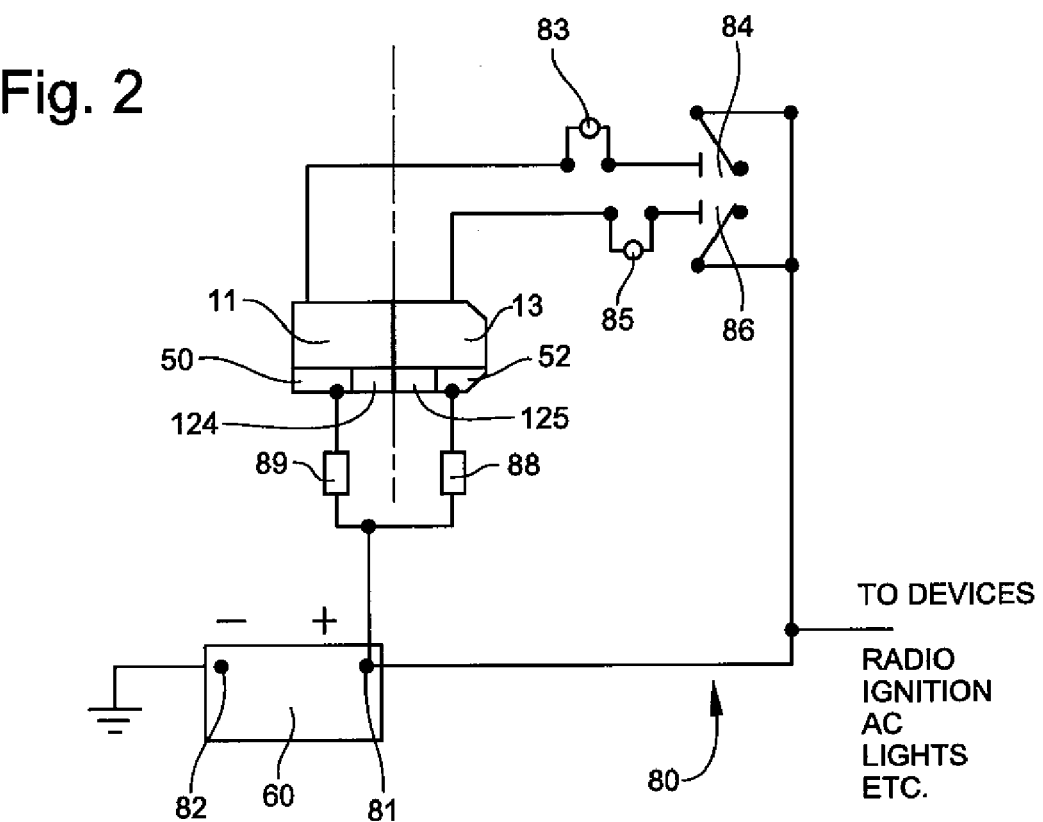
FIG. 2 is a schematic of an electrical system including the double alternator.

FIG. 2 is a diagram of an embodiment of a basic electrical system 80 for a vehicle including the double alternator 11 and 13. The system 80 includes a storage battery 60 including a main system power terminal 81 and a ground terminal 82 for connection to a system ground. Each rotor is supplied with field current from the battery 60 through one of a pair of single pole switches 84 and 86 and a lamp 83 or 85 is connected between each switch 84 or 86 and the alternator 10 to indicate whether the half of the alternator 11 or 13 to which the lamp 83 or 85 is connected is receiving current. One of a pair of diodes 88 and 89 is connected between each alternator half 11 and 13 and the main power terminal 81 of the battery 60 and the voltage regulators 124 and 125 and rectifiers 50 and 52 are also represented in the figure.

Figure 3:
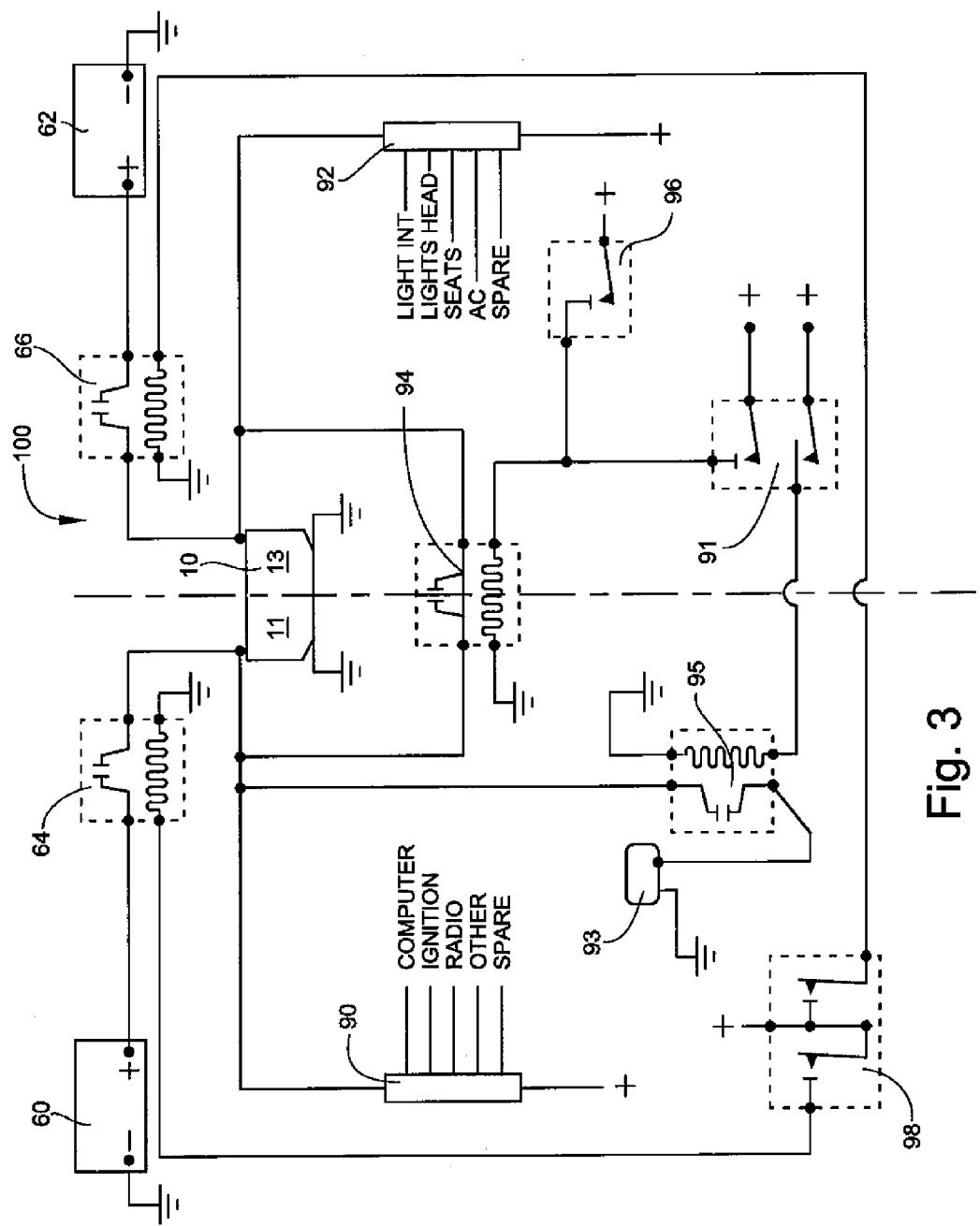
FIG. 3 is a schematic showing an alternative embodiment of the electrical system.

FIG. 3 is another exemplary electrical system 100 for a vehicle including the double alternator having the two halves 11 and 13. In the system represented by FIG. 3, the storage battery 60 is connected to a front busbar 90 where, for example, a vehicle computer, ignition system, and radio can be connected to receive current from the battery 60, and another storage battery 62 is connected to a rear busbar 92 that provides current to interior lights, headlights and air conditioning systems of the vehicle. Output from each of the rectifiers of the double alternator charges one of the storage batteries 60 or 62. In this embodiment of the double alternator electrical system, both batteries 60 and 62 are energized for starting the vehicle via the contactors 64, 66, 94 and 95 and a manual switch 96 is provided to connect a cross feed contactor 94 which cross feeds current between the busbars 90 and 92 so that the vehicle can continue to operate if one half of the double alternator 10 is not charging. The system also includes a starter 93, a manual double pole master switch 98 and a double pole starter switch 91.

Figure 4:
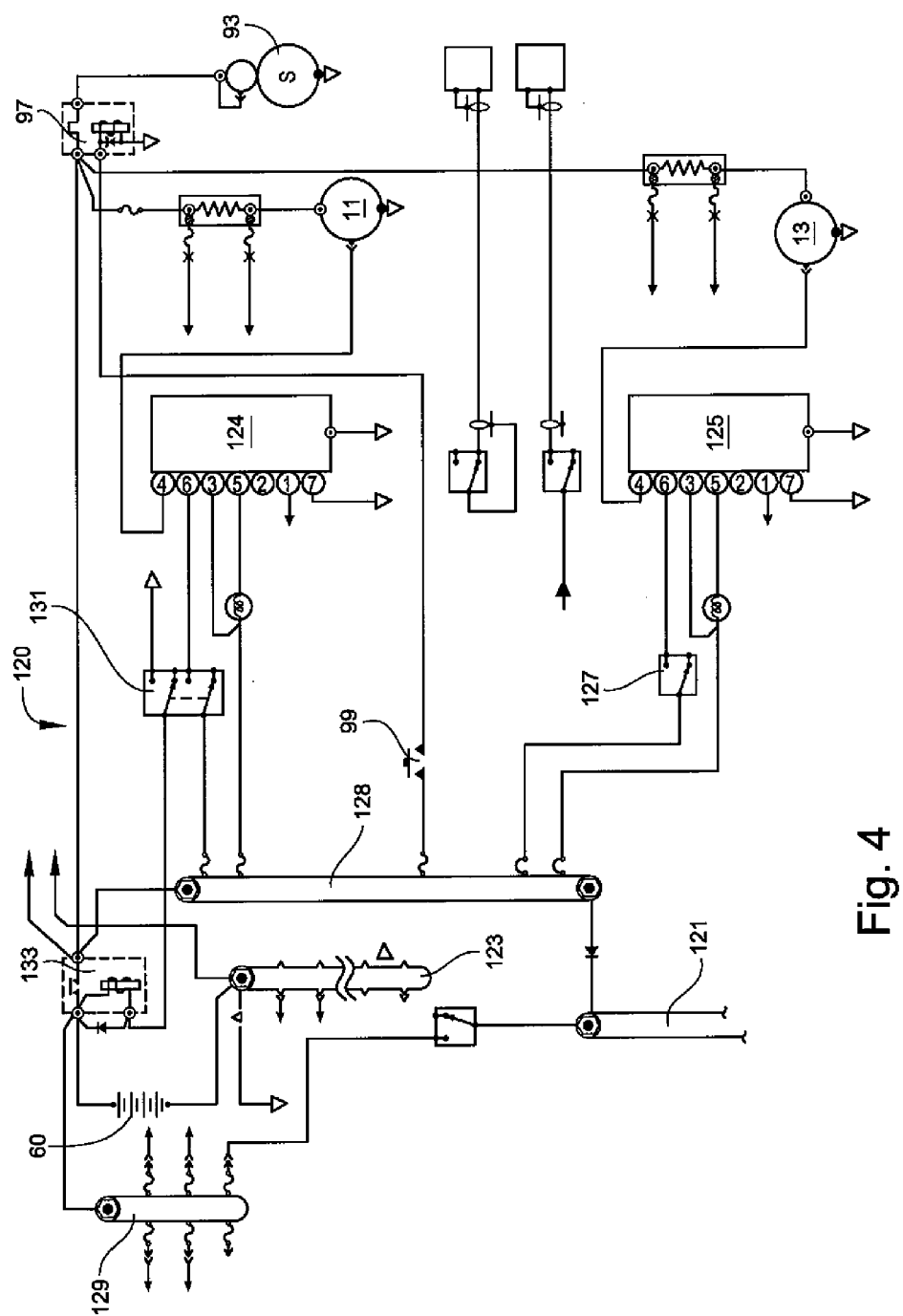
FIG. 4 is a circuit diagram of another alternative embodiment of the electrical system.

FIG. 4 is a circuit diagram of another exemplary electrical system 120 including the double alternator and a single storage battery 60. The diagram shows a pair of voltage regulators 124 and 125 each connected to control field current supplied to a respective half 11 and 13 of the double alternator from the battery 60. Another switch 127 is provided to selectively bring the half 13 of the alternator 10 online to charge the battery 60 to supply current to a main power bus 128 of the vehicle in the event the half 11 fails to charge. A starter switch 99, contactor 97, and starter 93 are provided for starting the vehicle and an essential busbar 121 is provided for connecting essential operating electronics. The system 120 also includes an instrument panel ground busbar 123 and a battery busbar 129. The battery 60 is connected to the system through a battery master switch 131 and contactor 133.

Figure 5:
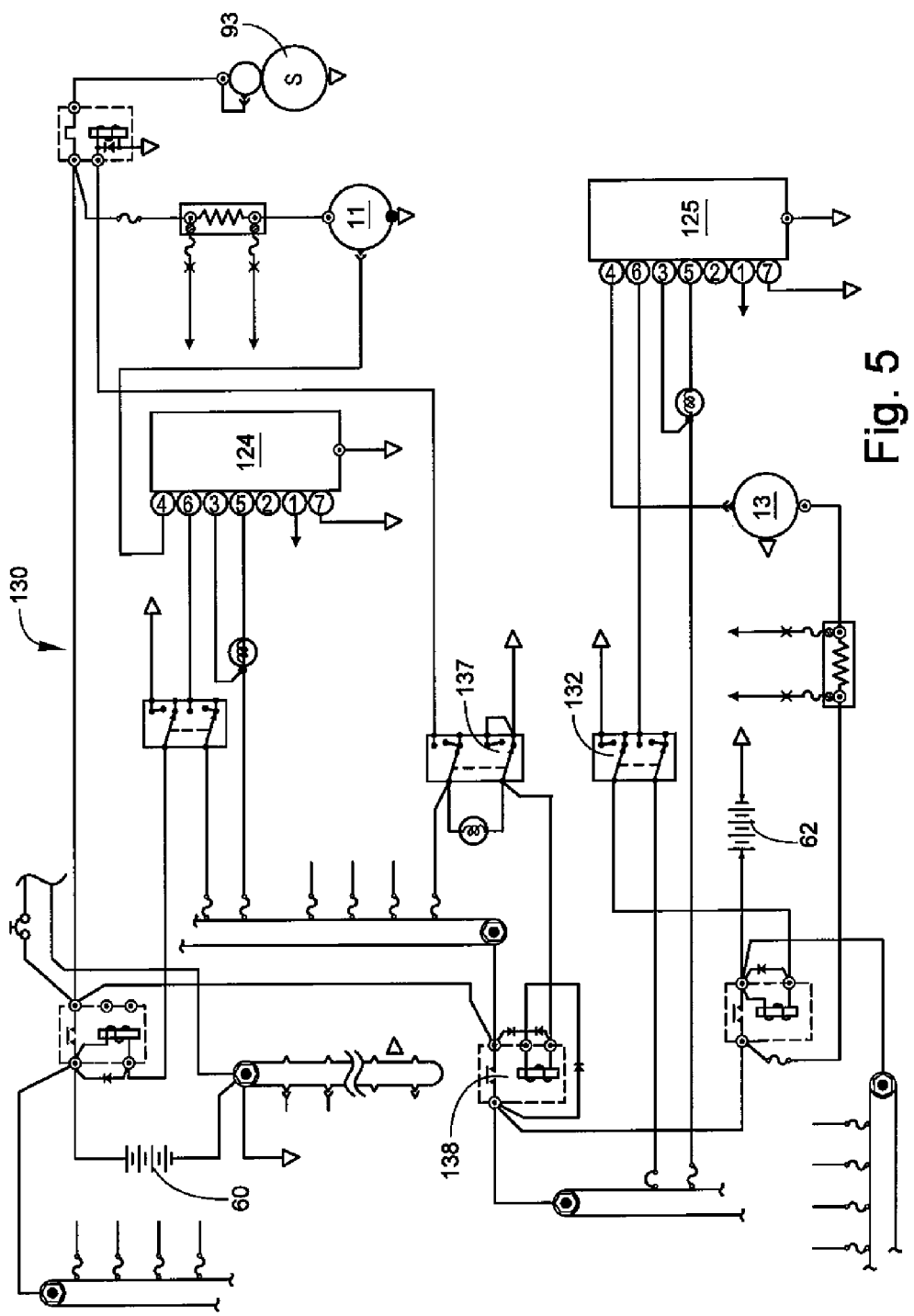
FIG. 5 is also a circuit diagram of an alternative embodiment of the system.

FIG. 5 is a circuit diagram of another alternative embodiment 130 of the electrical system including the double alternator. A primary battery 60 is charged by one half 11 and an auxiliary battery 62 via an auxiliary power switch 132 by the other half 13 of the double alternator. An auxiliary voltage regulator 125 provides a back up system available to power the primary power system via a cross feed switch 137 that closes a cross feed contactor 138.

Figure 6:
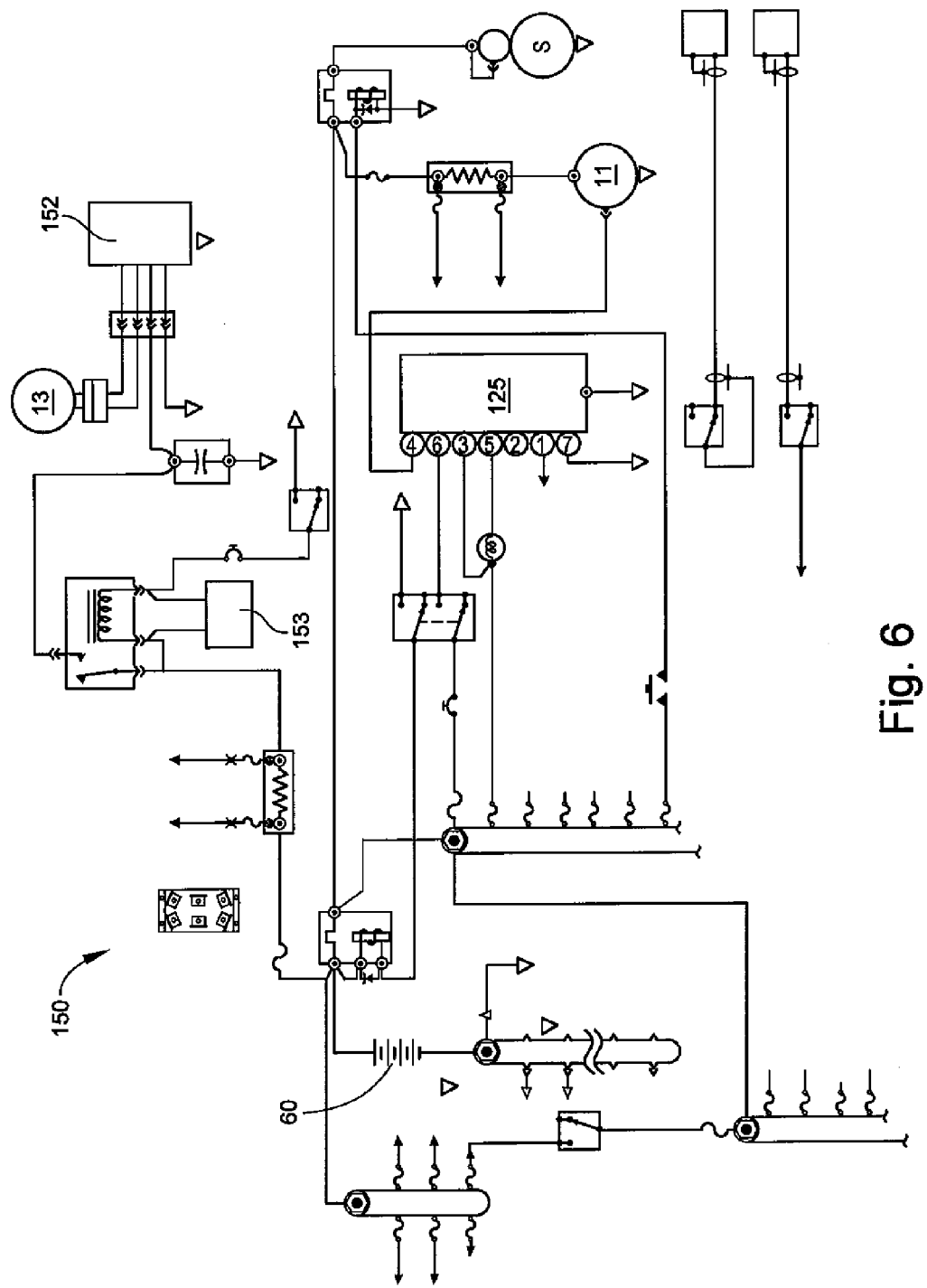
FIG. 6 is a circuit diagram of yet another alternative embodiment of the electrical system.

FIG. 6 is a circuit diagram of yet another alternative embodiment 150 of the electrical system including the double alternator and a battery 60. A voltage regulator 152 is provided to control the voltage output of the half 13 of the double alternator serving as an auxiliary alternator and a crow bar circuit 153 is included to prevent overvoltage from damaging the electrical system 150. A voltage regulator 125 is provided for controlling the other half 11 of the alternator.

Figure 7:
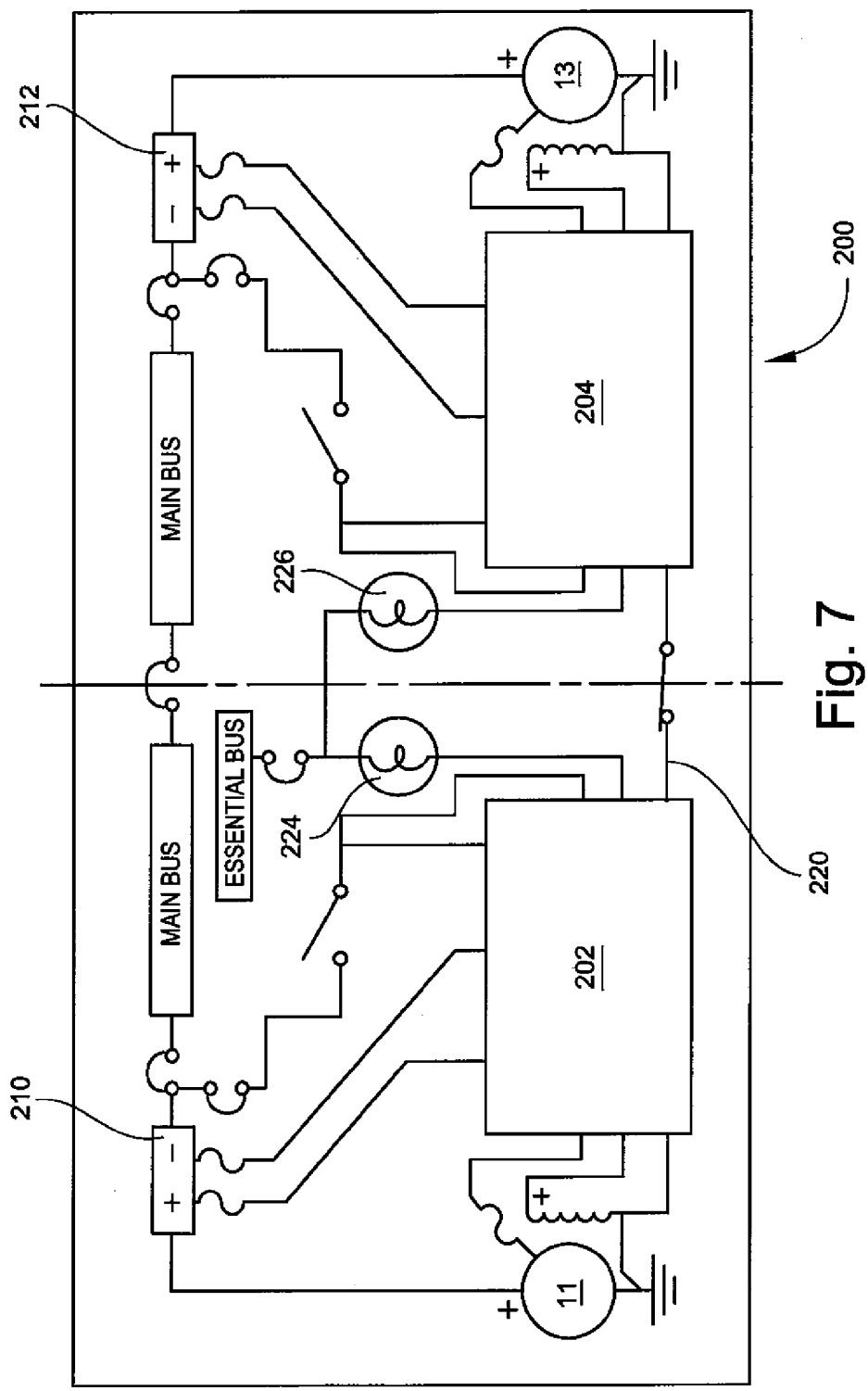
FIG. 7 is a schematic diagram of a controller for an electrical system including a double alternator.

FIG. 7 is a schematic diagram of an embodiment of a controller 200 for the double alternator 10. The controller 200 includes two voltage regulators 202 and 204 that each employ one of a pair of shunts 210 and 212 for measuring the voltage and or amperage output from the halves 11 and 13 of the alternator and adjusting the amount of field current supplied. An equalizer 220 is provided between the two field current outputs and one of a pair of independent annunciators 224 and 226 corresponds to each half 11 and 13 of the double alternator to indicate failures and thus the need to feed voltage from one of the alternator halves 11 or 13 to the other.

Embodiments of a double alternator for a vehicle and power systems using the double alternator are described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. An electrical system for a vehicle having a motor, the system comprising:
    (a) a housing including an adapter housing disposed between opposing front and rear housing sections;
    (b) a drive assembly including a shaft journalled in the front and rear housing sections and a pulley fixed radially about the shaft for being driven by the vehicle motor;
    (c) a pair of stators each including an output winding for providing a multi-phase AC voltage;
    (d) a pair of rotors each fixed radially about the shaft for rotation therewith to produce a magnetic field to induce the multi-phase AC voltage across the output windings of the stators;
    (e) two sets of slip rings, each ring encircling the shaft and electrically connected to one of the windings of one of the pair of rotors and insulated from the other slip rings and the shaft;
    (f) a pair of multi-phase full wave rectifiers, each electrically connected to one of the stators, for receiving the three-phase AC voltage produced across the winding of one of the stators and converting the AC voltage to DC voltage;
    (g) two sets of brushes, each set electrically connected to one of the slip rings to receive field current from a voltage regulator; and
    (h) a pair of voltage regulators for controlling DC voltage output.

2. The electrical system according to claim 1 further comprising a storage battery comprising a main system terminal and a ground terminal connected to a system ground, the main terminal connected to both the of the rectifiers for receiving the DC voltage and providing electrical power to the vehicle.

3. The electrical system according to claim 2 wherein said voltage regulators are connected to the field windings and sense an amount of current in the system to control an amount provided to the field windings.

4. The electrical system according to claim 1 further comprising a pair of single pole switches, each one of the pair for selectively connecting one of the field windings.

5. The electrical system according to claim 4 further comprising a pair of indicator lamps, each one of the pair connected between one of the pair of single pole switches and one of the field windings to indicate whether the field winding is receiving current from the main terminal.

6. An electrical system for a vehicle having a motor, the system comprising:
    (a) a housing including an adapter housing disposed between opposing front and rear housing sections;
    (b) a drive assembly including a shaft journalled in the front and rear housing sections and a pulley fixed radially about the shaft for being driven by the vehicle motor;
    (c) a pair of rotors each including a field winding and fixed radially about the shaft for rotation therewith and for providing current to produce a magnetic field to induce three-phase AC voltage and;
    (d) a pair of stators each including an output winding fixed around one of the rotors for producing the three-phase AC voltage;
    (e) a set of brushes corresponding to each rotor;
    (f) a pair three-phase full wave rectifiers each electrically connected to one of the output windings for receiving the three-phase AC voltage produced across the windings of one of the stators and converting the AC voltage to DC voltage;
    (g) a pair of voltage regulators, each one of the pair controlling DC voltage output from one of the rectifiers;
    (h) a first storage battery connected to a system ground and a first electrical power subsystem to receive DC voltage from one of the pair of three-phase full wave rectifiers;
    (i) a second storage battery connected to a system ground and a second electrical power subsystem to receive DC voltage from the other of the pair of three-phase full wave rectifiers; and
    (j) a cross feed switch for selectively cross feeding DC voltage between the first and second subsystems.

7. The electrical system according to claim 6 further comprising a front bus bar connected to the first power subsystem.

8. The electrical system according to claim 7 further comprising a computer, ignition, and radio connected to the front bus bar.

9. The electrical system according 7 further comprising a rear bus bar connected to the second power subsystem.

10. The electrical system according to claim 9 further comprising interior lights, headlights, seats and an air conditioner connected to the rear bus bar.

11. The electrical system according to claim 6 further including a cross feed contactor between the electrical power subsystems.

12. The electrical system according to claim 6 further including a double pole starter switch.

13. The electrical system according to claim 6 further comprising a manual double pole master switch.

14. The electrical system according to claim 6 wherein both batteries are energized to start the vehicle motor.

15. The electrical system according to claim 6 further including a starter for starting the vehicle motor.

16. An electrical system for a vehicle having a motor, the system comprising: a housing enclosing a pair of rotor windings fixed to a shaft to rotate to produce magnetic fields inducing a.c. voltage across a stator windings corresponding to each rotor, a rectifier electrically connected to one of the pair of stators to convert a.c. voltage from the first of the pair to d.c. voltage for charging a storage battery, a rectifier electrically connected to the other of the pair of stators to convert a.c. voltage from the other stator to d.c. voltage for charging the storage battery, a controller connected to both of the rotor windings for controlling an amount of voltage supplied to the rotor windings and hence the voltage supplied by the stators to charge the storage battery, and an electrical circuit supplying power to the vehicle connected to the battery.

17. The electrical system according to claim 16 wherein the voltage regulators employ shunts for measuring output voltage and or amperage from the rectifiers.

18. The electrical system according to claim 17 wherein the controller equalizes the field current provided to the rotor windings.

19. The electrical system according to claim 18 further including independent annunciator lamps for indicating alternator operating statuses.

* * * * *